US 7,505,758 B2

(12) United States Patent
Choi

(10) Patent No.: US 7,505,758 B2
(45) Date of Patent: Mar. 17, 2009

(54) APPARATUS AND METHOD FOR SETTING USE RESTRICTION OF MOBILE COMMUNICATION TERMINAL

(75) Inventor: Won Su Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 11/048,864

(22) Filed: Feb. 3, 2005

(65) Prior Publication Data
US 2005/0170813 A1  Aug. 4, 2005

(30) Foreign Application Priority Data
Feb. 4, 2004   (KR) .................. 10-2004-0007275

(51) Int. Cl.
H04M 1/66 (2006.01)
(52) U.S. Cl. ..................... 455/411; 455/410
(58) Field of Classification Search ............ 455/411, 455/410
See application file for complete search history.

(56) References Cited
U.S. PATENT DOCUMENTS

| | | | | |
|---|---|---|---|---|
| 5,355,412 A * | 10/1994 | Kangas | ...................... | 713/161 |
| 5,568,483 A * | 10/1996 | Padovani et al. | ............. | 370/468 |
| 5,809,413 A * | 9/1998 | Meche et al. | ............... | 455/411 |
| 6,201,811 B1 * | 3/2001 | Larsson et al. | ........... | 370/310.1 |
| 6,223,172 B1 * | 4/2001 | Hunter et al. | .................. | 707/3 |
| 6,230,017 B1 * | 5/2001 | Andersson et al. | ....... | 455/456.6 |
| 6,556,820 B1 * | 4/2003 | Le et al. | ...................... | 455/411 |
| 6,820,233 B2 * | 11/2004 | Johansson et al. | ........... | 714/808 |
| 6,839,434 B1 * | 1/2005 | Mizikovsky | ................. | 380/247 |
| 6,915,473 B2 * | 7/2005 | Bolourchi et al. | ........... | 714/755 |
| 6,928,066 B1 * | 8/2005 | Moon et al. | .................. | 370/342 |

(Continued)

FOREIGN PATENT DOCUMENTS
CN          1283939          2/2001

(Continued)

OTHER PUBLICATIONS
European Search Report dated Aug. 29, 2006.

(Continued)

Primary Examiner—George Eng
Assistant Examiner—Christopher M Brandt
(74) Attorney, Agent, or Firm—Ked & Associates, LLP

(57) ABSTRACT

A method for restricting the use of a mobile terminal including generating a coded value corresponding to a user authentication card, and determining whether or not the mobile terminal is available for use based on the generated coded value. Further, determining whether or not the mobile terminal is available for use includes checking whether or not the generated coded value is on a registration coded value list, and checking whether or not the generated coded value is on a prohibition coded value list if the generated coded value is not on the registration coded value list. The method also includes storing the generated coded value in a temporary coded value list and setting the mobile terminal in a first lock mode when the generated coded value is not on the registration or prohibition coded value lists, transmitting a lost terminal message to a loss management server, determining, by the loss management server, if the mobile terminal has been reported lost, and setting the mobile terminal in a second lock mode if the mobile terminal has been reported lost.

18 Claims, 3 Drawing Sheets

U.S. PATENT DOCUMENTS

| | | | |
|---|---|---|---|
| 7,003,282 B1* | 2/2006 | Ekberg | 455/411 |
| 7,003,320 B2* | 2/2006 | Muller | 455/558 |
| 7,016,669 B2* | 3/2006 | Aerrabotu et al. | 455/419 |
| 7,082,297 B2* | 7/2006 | Tuomi et al. | 455/411 |
| 2001/0016486 A1* | 8/2001 | Ko | 455/411 |
| 2001/0053684 A1* | 12/2001 | Pirila | 455/410 |
| 2002/0090965 A1* | 7/2002 | Chen et al. | 455/522 |
| 2002/0194571 A1* | 12/2002 | Parr et al. | 714/800 |
| 2003/0114191 A1* | 6/2003 | Nishimura | 455/557 |
| 2003/0126462 A1* | 7/2003 | Howard et al. | 713/200 |
| 2003/0166398 A1* | 9/2003 | Netanel | 455/410 |
| 2003/0211841 A1* | 11/2003 | Castrogiovanni et al. | 455/411 |
| 2003/0220094 A1* | 11/2003 | Hicks | 455/410 |
| 2004/0048610 A1* | 3/2004 | Kim et al. | 455/422.1 |
| 2004/0110488 A1* | 6/2004 | Komsi | 455/411 |
| 2004/0152445 A1* | 8/2004 | Muller | 455/410 |
| 2004/0242195 A1* | 12/2004 | Chun et al. | 455/410 |
| 2005/0009522 A1* | 1/2005 | Bi et al. | 455/435.3 |
| 2005/0037778 A1* | 2/2005 | Patel | 455/456.3 |
| 2005/0060363 A1* | 3/2005 | Jang et al. | 709/200 |
| 2005/0153740 A1* | 7/2005 | Binzel et al. | 455/558 |
| 2005/0153741 A1* | 7/2005 | Chen et al. | 455/558 |
| 2005/0220322 A1* | 10/2005 | Olesen et al. | 382/100 |
| 2005/0233729 A1* | 10/2005 | Stojanovski et al. | 455/411 |
| 2006/0073811 A1* | 4/2006 | Ekberg | 455/411 |

FOREIGN PATENT DOCUMENTS

| | | |
|---|---|---|
| GB | 2 327 570 A | 1/1999 |
| GB | 2 355 892 A | 5/2001 |
| JP | 11-501182 | 1/1999 |
| JP | 2001-510973 | 8/2001 |

OTHER PUBLICATIONS

Japanese Office Action dated Mar. 7, 2007 and English-language translation.

Chinese Office Action dated Mar. 30, 2007 and English-language translation.

* cited by examiner

APPARATUS AND METHOD FOR SETTING USE RESTRICTION OF MOBILE COMMUNICATION TERMINAL

CROSS-REFERENCE TO A RELATED APPLICATION

This application claims priority to Korean patent application No. 07275/2004 filed on Feb. 4, 2004, the entire contents of which is hereby incorporated in its entirety.

BACKGROUND OF THE INVENTION

1. Field of the Invention

The present invention relates to a mobile terminal, and more particularly to an apparatus and method for restricting the use of the mobile terminal.

2. Background of the Related Art

In general, a mobile communication system allows a user to wirelessly page or communicate with another party. The communication system includes, for example, a MSC (Mobile Switching Center) that controls at least one base station (BS) for communicating with a mobile terminal. Currently, data and multimedia communication, in addition to voice communication can be transmitted between mobile terminals.

To prevent someone from illegally using another person's terminal, mobile terminals generally require a password for using the terminal. However, every time the mobile terminal is turned on, the user has to re-enter the password. Further, it is possible someone may illegally obtain or hack the password and then illegally use the mobile terminal.

Another method for restricting the use of a mobile terminal is to require a user authentication card, such as a SIM (Subscriber Identity Module), a USIM (Universal Subscriber Identity Module), a UIM (User Identity Module) or an RUIM (Removable User Identity Module), etc. In this method, the terminal only operates when a combination of a password inputted by a user and information stored in the user authentication card is authenticated. Thus, even if the mobile terminal is lost and the password is leaked, someone arbitrarily else cannot use the mobile terminal.

Also, when a user authentication card of a mobile terminal is changed, the user is automatically requested to input a password, so that use of mobile terminal is restricted according to the inputted password. This method effectively strengthens security for the password and simplifies an input procedure of the password. This method, however, has shortcomings that whenever the mobile terminal is booted, the password needs to be re-entered, and a code for combining the inputted password and the information stored in the user authentication card is additionally required.

Another method is to allow a base station to determine during a registration process whether the terminal can be activated. This method is advantageous because the user does not have to continually enter a password. However, this method is disadvantageous because the base station restricts only functions related to a call connection and cannot restrict access to supplementary functions such as a phone book, a memo, or games.

SUMMARY OF THE INVENTION

Accordingly, one object of the present invention is to at least address the above-noted and other problems.

Another object of the present invention is to prevent the illegal use of a mobile terminal To achieve these and other advantages and in accordance with the purpose of the present invention, as embodied and broadly described herein, the present invention provides a novel method for restricting a use of a mobile terminal including generating a coded value corresponding to a user authentication card of the mobile terminal, and determining whether or not the mobile terminal is available for use based on the generated coded value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

Figure 1:
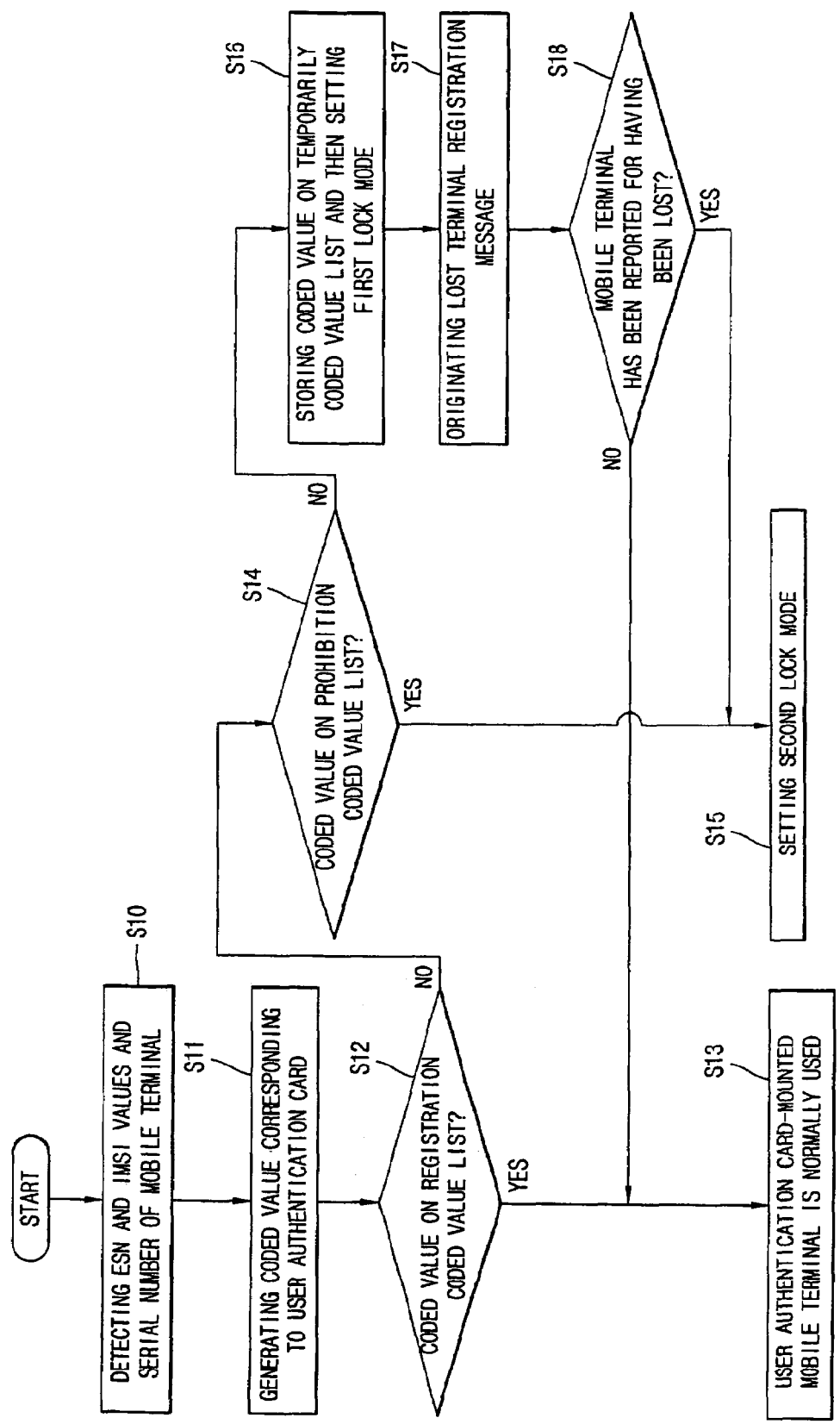
FIG. 1 is a flowchart of a method for restricting the use of a mobile terminal according to the present invention.

Referring now to the drawings, wherein like reference numerals designate identical or corresponding parts throughout the several views, the present invention will be described.

FIG. 1 is a flowchart of a method for restricting the use of a mobile terminal according to the present invention. The method includes detecting an ESN (Electronic Serial Number) value and an IMSI (Internet Mobile Station Identity) value from a UIM card mounted in the terminal, as well as a serial number of the mobile terminal (step S10). Then, a coded value corresponding to the UIM card is generated based on the detected ESN value, IMSI value and serial number of the terminal (step S11). Further, the method then checks whether or not the generated coded value is on a registration coded value list (step S12). If the coded value is not on the registration list (No in step S12), a determination is made as to whether or not the coded value is on a prohibition list (step S14).

When the coded value is not on the prohibition list (No in step S14), the coded value is stored in a temporary coded value list and then the mobile terminal is set to a first lock mode (step S16). In addition, when the mobile terminal is set to the first lock mode, a lost terminal registration message is sent to the mobile communication system (step S17). Further, in step S18, the mobile communication system determines whether or not the mobile terminal has been reported lost (step S18). When the mobile terminal has been reported lost (Yes in step S18), the mobile terminal is set to a second lock mode (step S15). Further, when the generated coded value is on the registration coded value list (Yes in step S12) or the mobile terminal has not been reported lost (No in step S18), the mobile terminal may be normally used (step S13).

Figure 2:
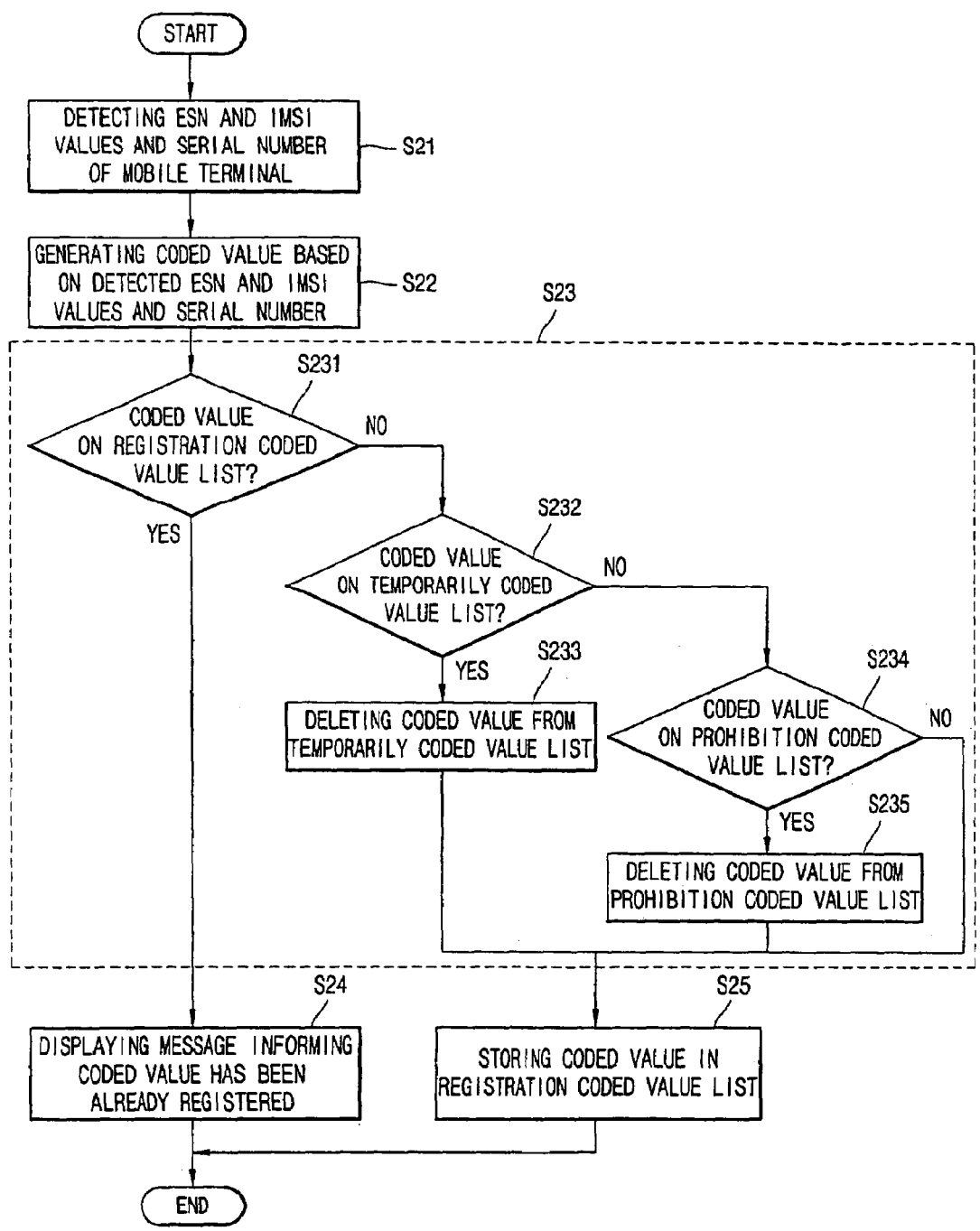
FIG. 2 is a flowchart of a method for registering a user authentication card according to the present invention.

Turning next to FIG. 2, which is a flowchart illustrating a method of registering a user authentication card according to the present invention. As shown, when the UIM card is inserted in the terminal, the ESN and IMSI values from the UIM card and a serial number from the mobile terminal are detected (step S21). Then, a coded value corresponding to the UIM card based on the detected ESN value, IMSI value and serial number is generated (step S22). Further, the method checks whether or not the generated code value is on a registration coded value list as identified by the general block step S23. When the coded value has not been previously registered (i.e., is not on the registration coded value list), the coded value is stored in the registration list (step S25). Further, when the coded value has already been registered (i.e., is on the registration coded value list), a message indicating that the coded value has already been registered is displayed (step S24).

In addition, because the mobile terminal generally does not itself store information such as the ESN and the IMSI of the UIM card, the generated coded value may be stored using a coding algorithm. For example, the coded value may be obtained by masking the ESN value and the IMSI value of the user authentication card with the serial number of the terminal, and then the masked ESN and IMSI values and a checksum bit are added to generate the coded value. In addition, several UIM cards may also be registered. Thus, the coded values of each UIM card can be generated and stored as C1, C2, . . . , Cn, for example.

Step S23 will now be described in more detail. As shown, the mobile terminal determines whether or not the generated coded value is on the registration coded value list (step S231). When the coded value is on the registration list (Yes in step S231), the mobile terminal informs the user that the UIM card has been already registered (step S24). However, when the coded value is not on the registration list (No in step S231), the mobile terminal determines whether or not the coded value is on a temporary coded value list (step S232).

When the coded value is on the temporary list (Yes in step S232), the coded value is deleted from the temporary list (step S232) and then stored in the registration coded value list (step S25). However, when the coded value is not on the temporary list (No in step S232), the mobile terminal determines whether or not the coded value is on the prohibition coded value list (step S234).

As shown, when the coded value is on the prohibition list (Yes in step S234), the mobile terminal deletes the coded value from the prohibition coded value list (step S235) and then stores it in the registration list (step S25). When, however, the coded value is not in the prohibition list (No in step S234), the mobile terminal stores the coded value in the registration list (step S25). In this manner, the mobile terminal registers the generated coded value in the registration coded value list based on the ESN and IMSI values and the serial number, so that every function of the mobile terminal can be normally used through the coded value-registered UIM card.

Thereafter, whenever the UIM card-mounted mobile terminal is booted, the processes in FIG. 1 are performed. In more detail, a coded value corresponding to the UIM card is generated (step S11) and compared with coded values C1, C2, . . . , Cn, for example, stored in the registration list (step S12). When the generated coded value is on the registration list, the functions of the mobile terminal can be normally used (step S13). However, when the generated coded value is not on the registration list, the mobile terminal checks whether or not the coded value is on the prohibition list (step S14).

When the coded value is on the prohibition list, the mobile terminal is set to the second lock mode (step S15). When, however, the coded value is not on the prohibition coded value list, the mobile terminal stores the coded value in the temporary coded value list and is set to the first lock mode (step S16). Further, the first lock mode signifies permission of only a partial function of the mobile terminal, such as registering the UIM card, and the second lock mode means every function of the mobile terminal is locked (e.g., prevented from being used).

Thereafter, the mobile terminal transmits a lost terminal registration message to the base station (step S17). Then, a corresponding short message service (SMS) center receives the lost terminal registration message from the base station and transmits the lost terminal registration message to a loss management server.

The loss management server reverse calculates the ESN and IMSI values of the UIM card from the coded value included in the lost terminal registration message, and then, the loss management server checks whether the calculated ESN and IMSI values of the UIM card and the lost terminal information registered in the database are identical to determine whether the mobile terminal should be set to the second lock mode (step S18).

Further, the mobile terminal stores the coded value for a period of time (e.g., one week) in the temporary coded value list, and when a message restricting the use of the mobile terminal is not received from the loss management server within the pre-set time, the mobile terminal automatically stores the coded value in the registration coded value list.

When the mobile terminal is lost, the lost terminal server transmits a message indicating the mobile terminal should be set to the second lock mode. Then, the mobile terminal stores the coded value in the prohibition coded value list and then is set to the second lock mode (step S15). When the mobile terminal is not lost, the functions of the mobile terminal can be normally used (step S13).

Figure 3:
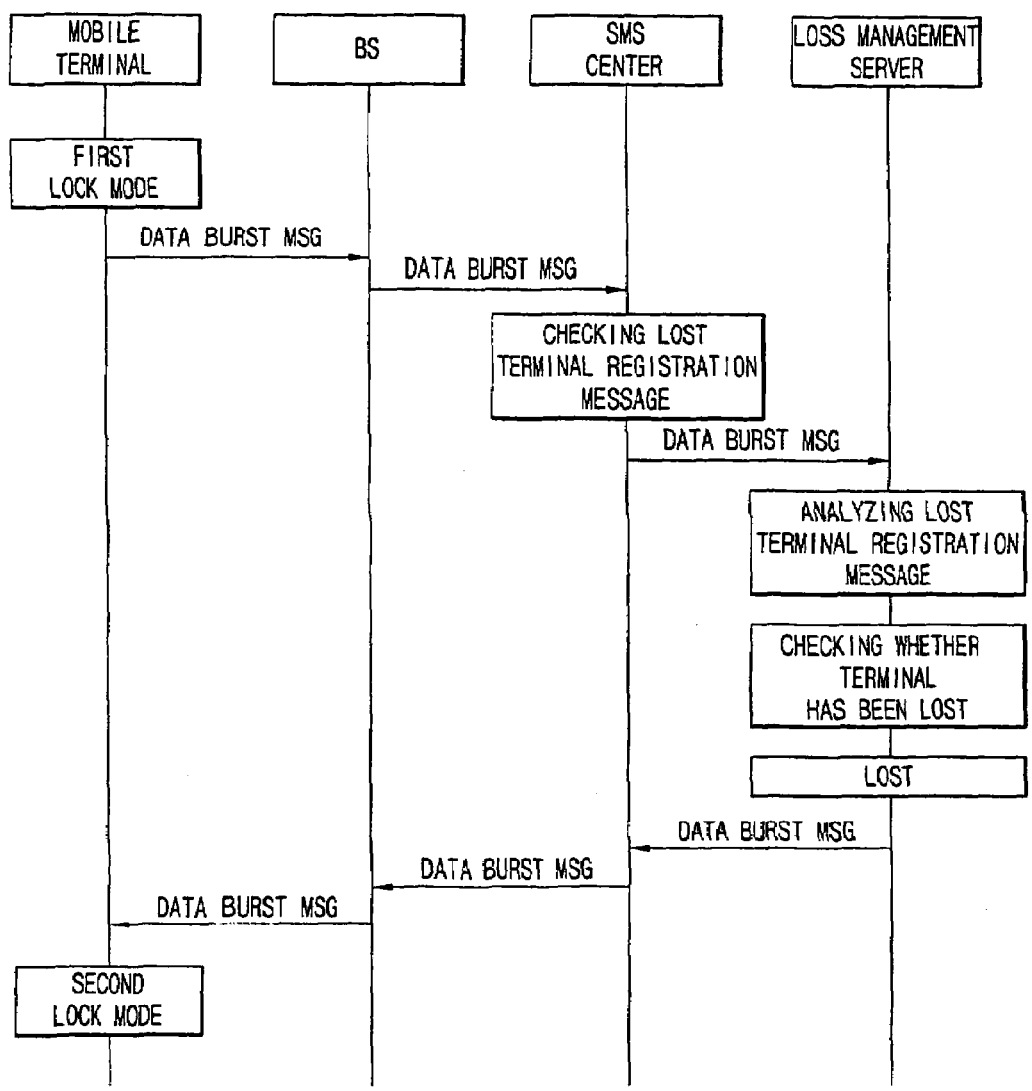
FIG. 3 illustrates a message transmission/reception process for restricting the use of a mobile terminal according to the present invention.

The message transmission/reception process for restricting the use of the mobile terminal will now be described with reference to FIG. 3. As shown, when the coded value corresponding to the UIM card is not on the registration prohibition list, the mobile terminal originates a message including the coded value and the serial number of the mobile terminal to the BS.

Upon receiving the message from the mobile terminal, the BS transmits the message to the SMS center. The SMS center then determines whether the received message is a lost terminal registration message, and transmits the lost message to the loss management server. Then, the loss management server detects the ESN and IMSI values from the received message and determines whether the mobile terminal is a lost mobile terminal using a database that stores information about lost terminals.

If the terminal was reported lost, the loss management server transmits a message to restrict every function of the mobile terminal to the mobile terminal. The mobile terminal is then set in the second lock mode to thereby restrict every function of the mobile terminal.

As so far described, the method for restricting the use of the mobile terminal according to the present invention has at least the following advantage. Because use of the mobile terminal is determined based on a coded value generated corresponding to a user authentication card, illegal use of the mobile terminal by someone else can be prevented.

The above method was described with respect to a UIM. However, a SIM, USIM, RUIM, etc. may also be used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for restricting a use of a mobile terminal, comprising:
    inserting a user authentication card into the mobile terminal;
    generating a coded value by masking an Electronic Serial Number (ESN) value and an Internet Mobile Station Identity (IMSI) value of the user authentication card with a serial number of the mobile terminal and by adding the masked ESN and IMSI values and a checksum bit; and
    determining whether or not the mobile terminal is available for use based on the generated coded value, wherein determining whether or not the mobile terminal is available for use includes:
        determining whether or not the generated coded value is on a registration coded value list that identifies registered coded values, each registered coded value being based on information of a user authentication card and a mobile terminal,
        determining whether or not the generated coded value is on a prohibition coded value list in response to the determination that the generated coded value is not on the registration coded value list, the prohibition coded value list being different than the registration coded value list,
        storing the generated coded value in a temporary coded value list and setting the mobile terminal in a first lock mode in response to the determination that the generated coded value is not on the registration coded value list and the determination that the generated coded value is not on the prohibition coded value list, the temporary coded value list being different than the prohibition coded value list and different than the registration coded value list,
        automatically storing the coded value in the registration coded value list in response to the mobile terminal not receiving a message restricting use of the mobile terminal after a specific period of time from when the mobile terminal stores the generated coded value in the temporary coded value list, and
        changing the mobile terminal from the first lock mode to a second lock mode when the mobile terminal has been reported lost and the generated coded value is stored in the temporary coded value list, the second lock mode being different than the first lock mode.

2. The method of claim 1, wherein the user authentication card includes a SIM (Subscriber Identity Module), a USIM (Universal Subscriber Identity Module), a UIM (User Identity Module) or an RUIM (Removable User Identity Module).

3. The method of claim 1, further comprising:
    detecting the ESN value and the IMSI value of the user authentication card and the serial number of the mobile terminal when the user authentication card is inserted into the mobile terminal.

4. The method of claim 1, wherein the first lock mode only allows registration of the authentication card, and the second lock mode restricts all functions of the mobile terminal.

5. The method of claim 1, further comprising:
    setting the mobile terminal in the second lock mode that restricts all functions of the mobile terminal if the generated coded value is on the prohibition coded value list.

6. The method of claim 1, further comprising:
    setting the mobile terminal in a normal use state if the generated coded value is on the registration coded value list; and
    transmitting a message to the mobile terminal indicating the normal use state.

7. The method of claim 1, wherein determining when the mobile terminal has been reported lost comprises:
    calculating ESN and IMSI values of the user authentication card based on a lost terminal message transmitted from the mobile terminal; and
    determining whether or not the mobile terminal has been reported lost based on the calculated ESN and IMSI values and information of the mobile terminal previously stored in a database.

8. The method of claim 7, wherein the lost terminal message includes a serial number of the mobile terminal and a coded value corresponding to the ESN and IMSI values of the user authentication card mounted in the mobile terminal.

9. A communication system for restricting a use of a mobile terminal, comprising:
    a mobile terminal configured to support insertion of a user authentication card and to generate a coded value, the generated coded value obtained by masking an Electronic Serial Number (ESN) value and an Internet Mobile Station Identity (IMSI) value of the user authentication card with a serial number of the mobile terminal and by adding the masked ESN and IMSI values and a checksum bit; and
    a loss management server configured to determine whether or not the mobile terminal is available for use based on the generated coded value, wherein the loss management server:
        determines whether or not the mobile terminal is available by determining whether or not the generated coded value is on a registration coded value list that identifies a plurality of registered coded values,
        determines whether or not the generated coded value is on a prohibition coded value list in response to the determination that the generated coded value is not on the registration coded value list, the prohibition coded value list being different than the registration coded value list,
        stores the generated coded value in a temporary coded value list and sets the mobile terminal in a first lock mode in response to the determination that the generated coded value is not on the registration coded value list and the determination that the generated coded value is not on the prohibition coded value list, the temporary coded value list being different than the prohibition coded value list and different than the registration coded value list,
        automatically stores the coded value in the registration coded value list in response to the mobile terminal not receiving a message restricting use of the mobile terminal after a specific period of time from when the mobile terminal stores the generated coded value in the temporary coded value list,
        determines by searching a database if the mobile terminal has been reported lost, and
        changes the mobile terminal from the first lock mode to a second lock mode when the mobile terminal has been reported lost, the second lock mode being different than the first lock mode.

10. The system of claim 9, wherein the user authentication card includes a SIM (Subscriber Identity Module), a USIM (Universal Subscriber Identity Module), a UIM (User Identity Module) or an RUIM (Removable User Identity Module).

11. The system of claim 9, wherein the mobile terminal detects the ESN value and the IMSI value of the user authentication card and the serial number of the mobile terminal when the user authentication card is inserted into the mobile terminal.

12. The system of claim 9, wherein the first lock mode only allows registration of the user authentication card, and the second lock mode restricts all functions of the mobile terminal.

13. The system of claim 9, wherein the loss management server transmits a message to the mobile terminal to set the mobile terminal in the second lock mode that restricts all functions of the mobile terminal when the generated coded value is determined to be on the prohibition coded value list.

14. The system of claim 9, wherein the loss management server determines if the mobile terminal has been lost by calculating ESN and IMSI values of the user authentication card, and determines whether or not the mobile terminal has been lost based on the calculated ESN and IMSI values and information of the mobile terminal previously stored in a database.

15. The system of claim 9, wherein the coded value is generated in response to the user authentication card being inserted into the mobile terminal.

16. The method of claim 1, wherein the coded value is generated in response to the user authentication card being inserted into the mobile terminal.

17. The method of claim 9, wherein each registered coded value in the registration coded value list is generated based on an ESN value and an IMSI value of a respective user authentication card and a serial number of a respective mobile terminal.

18. The method of claim 1, wherein each registered coded value in the registration coded value list is generated based on an ESN value and an IMSI value of a respective user authentication card and a serial number of a respective mobile terminal.

* * * * *